United States Patent
Seto

(10) Patent No.: US 7,177,962 B2
(45) Date of Patent: Feb. 13, 2007

(54) MULTIFUNCTIONAL APPARATUS HAVING FACSIMILE AND COPYING FUNCTIONS WHEREIN BOTH FUNCTIONS SHARE THE SAME CONVEYING PATH WHEN READING AND PRINTING DATA

(75) Inventor: Noriaki Seto, Ibaraki (JP)

(73) Assignee: Canon Kabushiki Kaisha (JP)

( * ) Notice: Subject to any disclaimer, the term of this patent is extended or adjusted under 35 U.S.C. 154(b) by 490 days.

(21) Appl. No.: 10/740,434

(22) Filed: Dec. 18, 2003

(65) Prior Publication Data

US 2004/0186923 A1    Sep. 23, 2004

(30) Foreign Application Priority Data

Dec. 25, 2002  (JP) .............................. 2002-375142

(51) Int. Cl.
G06F 3/00 (2006.01)
H04N 1/04 (2006.01)
H04N 1/21 (2006.01)

(52) U.S. Cl. ............................. 710/38; 710/5; 710/33; 271/9.08; 271/9.02; 400/605; 400/582; 400/608.2; 400/607; 358/296; 358/498

(58) Field of Classification Search .................. 710/5, 710/33, 38; 271/9.08, 9.02; 400/605, 582, 400/608.2, 607; 358/296, 498
See application file for complete search history.

(56) References Cited

U.S. PATENT DOCUMENTS

| | | | | |
|---|---|---|---|---|
| 5,124,800 A | * | 6/1992 | Hashimoto | 358/296 |
| 5,651,623 A | * | 7/1997 | Stodder et al. | 400/605 |
| 5,954,326 A | * | 9/1999 | Gaarder et al. | 271/9.02 |
| 6,029,970 A | * | 2/2000 | Hwang | 271/9.08 |
| 6,520,700 B1 | * | 2/2003 | Iwata | 400/582 |
| 6,633,417 B1 | * | 10/2003 | Chang et al. | 358/498 |
| 6,987,574 B2 | * | 1/2006 | Potakowskyj | 358/1.1 |

FOREIGN PATENT DOCUMENTS

| | | | |
|---|---|---|---|
| JP | 60016763 | * | 1/1985 |
| JP | 6-86001 A | | 3/1994 |
| JP | 11-187212 A | | 7/1999 |
| JP | 2000299767 A | * | 10/2000 |

* cited by examiner

*Primary Examiner*—Tammara Peyton
(74) *Attorney, Agent, or Firm*—Rossi, Kimms & McDowell LLP

(57) ABSTRACT

There is provide a reading/recording apparatus capable of ensuring that a reading device and a recording device do not collide when the apparatus is miniaturized to thereby protect the reading unit and the recording unit by having the reading device and the recording device share a moving space on a shared conveying path used as both a conveying path for an original and a conveying path for a recording sheet. The original is conveyed to a reading position on the shared conveying path. The reading unit is freely movable between the reading position and a reading standby position away from the reading position, and reads an image of the original at the reading position. The recording medium is conveyed to a recording position on the shared conveying path. The recording unit moves within the same space on the shared conveying path as the reading unit, is freely movable between the recording position and a recording standby position away from the recording position, and records an image on the recording medium at the recording position. The reading unit is moved from the reading position to the reading standby position after a reading operation by the reading unit has been completed.

20 Claims, 14 Drawing Sheets

MULTIFUNCTIONAL APPARATUS HAVING FACSIMILE AND COPYING FUNCTIONS WHEREIN BOTH FUNCTIONS SHARE THE SAME CONVEYING PATH WHEN READING AND PRINTING DATA

BACKGROUND OF THE INVENTION

1. Field of the Invention

The present invention relates to a reading/recording apparatus, a reading/recording control method, and a program for implementing the reading/recording control method.

2. Description of the Related Art

In recent years, as terminal apparatuses have been made smaller in size, there have also been demands for miniaturization of information terminal apparatuses. In particular, in a reading/recording apparatus such as a facsimile apparatus for domestic use, a sheet conveying mechanism used for a reading operation and a sheet conveying mechanism used for a recording operation are completely separate from each other, so that a space where a reading unit reads an original (document) during transmission is separate from a space where a recording unit performs the recording operation during reception.

FIG. 15 is a cross-sectional view showing the construction of a conventional reading/recording apparatus. In this conventional reading/recording apparatus, recording sheets 301 are placed on a recording sheet holding member 303 and are fed sheet by sheet by a recording sheet feeding roller 304 and a separating mechanism. The fed recording sheet is conveyed to a recording section 306 by a conveying roller 305 and is discharged from the apparatus (in the direction shown by the arrow B in FIG. 15) by a discharge roller 307 while an image is being formed on the recording sheet by a recording section such as an inkjet cartridge.

On the other hand, originals 302 are placed on an original holding member 308 and are set on a wedge-shaped abutting section formed of an original separating roller 309 and a separating arm 313. When the original separating roller 309 rotates according to an image reading instruction, out of the originals held at the abutting section, only an original in contact with the original separating roller 309 is separated using friction and is conveyed.

The separated and conveyed original 302 is further conveyed by an original feeding roller 310, a discharge roller 312, and opposing rollers while being held therebetween. While an image on the original 302 is being read by a contact image sensor 311, the original 302 is discharged from the apparatus (in the direction shown by the arrow A in FIG. 15).

For a reading/recording apparatus such as a copier or a facsimile apparatus, various functions and improvements have been implemented to make such apparatus more convenient to use, according to demands from customers. One of such demands is for miniaturization of the apparatus. For users who wish to make effective use of limited space, apparatus size is especially important when purchasing equipment.

However, in the conventional reading/recording apparatus described above, the sheet conveying mechanism for the reading operation and the sheet conveying mechanism for the recording operation are completely separate from each other, that is, the space in which the reading unit reads the original during transmission is separate from the space in which the recording unit performs the recording operation during reception, so that it is necessary to provide separate physical spaces for the reading operation and the recording operation. This makes it difficult to miniaturize the apparatus.

On the other hand, there is a known technique for reducing apparatus size by using a single reading/recording path mechanism with a shared conveying path on which both originals and recording sheets are conveyed. Specifically, by conveying originals using the same conveying mechanism used for conveying recording sheets, it is possible to omit a feed roller, discharge roller, original driving motor, original detecting sensor, and the like that are used for conveying originals. However, in an inkjet reading/recording apparatus where recording is performed by moving the recording unit, it is necessary to drive the reading unit and the recording unit in different spaces, so that a sufficient reduction in apparatus size cannot be made.

To further miniaturize a reading/recording apparatus, studies are being performed to make the reading unit freely movable between a reading position located on a shared conveying path for conveying originals and recording sheets and a reading standby position receded from the reading position where the reading unit waits until a read instruction is issued and make the recording unit that moves in the main scanning direction and the reading unit share a moving space. However, if it is simply arranged that the recording unit and the reading share a moving space, when a reading operation and a recording operation occur simultaneously, the reading unit and the recording unit collide, which in some cases results in damage.

For example, there is the risk that when a reading operation is performed, the reading unit is disposed at the reading position located on the shared conveying path. If on this occasion, a conveyed medium detecting sensor detects a conveyed medium on the shared conveying path, irrespective of the reading operation being performed, the conveyed medium will be erroneously detected as a recording sheet and the recording operation will start. Consequently, there is the fear that the reading unit and the recording unit collide with each other. Also, if during a recording operation the reading unit remains on the shared conveying path, there is a fear that a paper jam occurs.

SUMMARY OF THE INVENTION

It is an object of the present invention to provide a reading/recording apparatus and a reading/recording control method which are capable of ensuring that a reading device and a recording device do not collide when the apparatus is miniaturized to thereby protect the reading unit and the recording unit by having the reading device and the recording device share a moving space on a shared conveying path used as both a conveying path for an original and a conveying path for a recording sheet, as well as a program for implementing the reading/recording control method.

To attain the above object, in a first aspect of the present invention, there is provided a reading/recording apparatus comprising a shared conveying path used as both a conveying path for an original and a conveying path for a recording medium, an original conveying device that conveys the original to a reading position on the shared conveying path, a reading device that is freely movable between the reading position and a reading standby position away from the reading position and reads an image of the original at the reading position, a recording medium conveying device that conveys the recording medium to a recording position on the shared conveying path, a recording device that moves within the same space on the shared conveying path as the reading device, is freely movable between the recording position and a recording standby position away from the recording position, and records an image on the recording medium at the recording position, and a control device that causes the reading device to move from the reading position to the reading standby position after a reading operation by the reading device has been completed.

According to the first aspect of the present invention, it is possible to ensure that the reading device and the recording device do not collide when the apparatus is miniaturized to thereby protect the reading unit and the recording unit by having the reading device and the recording device share a moving space on a shared conveying path used as both a conveying path for an original and a conveying path for a recording medium. Further, it can be avoided that the reading device stays on the shared conveying path during the recording operation, to make it possible to prevent occurrence of a paper jam or the like.

Moreover, it is also possible to reduce the time spent on exclusive control operation of one of the reading device and the recording device within the shared moving space, thereby suppressing delays in reading and recording operations.

Preferably, the reading/recording apparatus comprises a rotary shaft extending in a main scanning direction, and wherein the reading device is freely rotatable about the rotary shaft between the reading position and the reading standby position, and the control device is responsive to the reading device having read an image of the original at the reading position on the shared conveying path, for causing the reading device to the reading standby position away from the reading position.

Also preferably, the recording device is freely movable in a main scanning direction on the shared conveying path, and the control device causes the recording device to stay at the recording standby position away from the recording position during the reading operation by the reading device.

To attain the above object, in a second aspect of the present invention, there is provided a reading/recording apparatus comprising a shared conveying path used as both a conveying path for an original and a conveying path for a recording medium, an original conveying device that conveys the original to a reading position on the shared conveying path, a reading device that is freely movable between the reading position and a reading standby position away from the reading position and reads an image of the original at the reading position, a recording medium conveying device that conveys the recording medium to a recording position on the shared conveying path, a recording device that moves within the same space on the shared conveying path as the reading device, is freely movable between the recording position and a recording standby position away from the recording position, and records an image on the recording medium at the recording position, and a control device that causes the reading device to move from the reading position to the reading standby position before start of a recording operation by the recording device.

Preferably, the reading/recording apparatus comprises a rotary shaft extending in a main scanning direction, and the reading device is freely rotatable about the rotary shaft between the reading position and the reading standby position, and the control device is responsive to the reading device having read an image of the original at the reading position on the shared conveying path, for causing the reading device to the reading standby position away from the reading position.

Also preferably, the recording device is freely movable in a main scanning direction on the shared conveying path, and the control device causes the recording device to stay at the recording standby position away from the recording position during the reading operation by the reading device.

To attain the above object, in a third aspect of the present invention, there is provided a reading/recording apparatus comprising a shared conveying path used as both a conveying path for an original and a conveying path for a recording medium, an original conveying device that conveys the original to a reading position on the shared conveying path, a reading device that is freely movable between the reading position and a reading standby position away from the reading position and reads an image of the original at the reading position, a recording medium conveying device that conveys the recording medium to a recording position on the shared conveying path, a recording device that moves within the same space on the shared conveying path as the reading device, is freely movable between the recording position and a recording standby position away from the recording position, and records an image on the recording medium at the recording position, and a control device that causes the reading device to move from the reading position to the reading standby position only once after completion of a reading operation by the reading device and before start of a recording operation by the recording device when the recording operation by the recording device immediately follows the reading operation by the reading device.

Preferably, the reading/recording apparatus comprises a rotary shaft extending in a main scanning direction, and the reading device is freely rotatable about the rotary shaft between the reading position and the reading standby position, and the control device is responsive to the reading device having read an image of the original at the reading position on the shared conveying path, for causing the reading device to the reading standby position away from the reading position.

Also preferably, the recording device is freely movable in a main scanning direction on the shared conveying path, and the control device causes the recording device to stay at the recording standby position away from the recording position during the reading operation by the reading device.

To attain the above object, in a fourth aspect of the present invention, there is provided a reading/recording apparatus comprising a shared conveying path used as both a conveying path for an original and a conveying path for a recording medium, an original conveying device that conveys the original to a reading position on the shared conveying path, a reading device that is freely movable between the reading position and a reading standby position away from the reading position and reads an image of the original at the reading position, a recording medium conveying device that conveys the recording medium to a recording position on the shared conveying path, a recording device that moves within the same space on the shared conveying path as the reading device, is freely movable between the recording position and a recording standby position away from the recording position, and records an image on the recording medium at the recording position, a first control device that causes the reading device to move from the reading position to the reading standby position after completion of a reading operation by the reading device, and a second control device that causes the reading device to move from the reading position to the reading standby position before start of a recording operation by the recording device, wherein either the first control device or the second control device is actuated to cause the reading device to move from the reading position to the reading standby position after completion of a reading operation by the reading device and before start of a recording operation by the recording device when the recording operation by the recording device immediately follows the reading operation by the reading device.

Preferably, the reading/recording apparatus comprises a rotary shaft extending in a main scanning direction, and the reading device is freely rotatable about the rotary shaft between the reading position and the reading standby position, and the control device is responsive to the reading device having read an image of the original at the reading position on the shared conveying path, for causing the reading device to the reading standby position away from the reading position.

Also preferably, the recording device is freely movable in a main scanning direction on the shared conveying path, and the control device causes the recording device to stay at the recording standby position away from the recording position during the reading operation by the reading device.

To attain the above object, in a fifth aspect of the present invention, there is provided a reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within the same space on the shared conveying path as the reading device, is freely movable between a recording position on the shared conveying path and a recording standby position away from the recording position, and records an image on the recording medium, the method comprising an original conveying step of conveying the original to the reading position, a reading step of reading an image of the original at the reading position by the reading device, a recording medium conveying step of conveying the recording medium to the recording position, a recording step of causing the recording device to record an image on the recording medium at the recording position, and a control step of causing the reading device to move from the reading position to the reading standby position after a reading operation in the reading step has been completed.

To attain the above object, in a sixth aspect of the present invention, there is provided a reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within the same space on the shared conveying path as the reading device, is freely movable between a recording position on the shared conveying path and a recording standby position away from the recording position, and records an image on the recording medium, the method comprising an original conveying step of conveying the original to the reading position, a reading step of reading an image of the original at the reading position by the reading device, a recording medium conveying step of conveying the recording medium to the recording position, a recording step of causing the recording device to record an image on the recording medium at the recording position, and a control step of causing the reading device to move from the reading position to the reading standby position before start of a recording operation in the recording step.

To attain the above object, in a seventh aspect of the present invention, there is provided a reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within the same space on the shared conveying path as the reading device, is freely movable between a recording position on the shared conveying path and a recording standby position away from the recording position, and records an image on the recording medium, the method comprising an original conveying step of conveying the original to the reading position, a reading step of reading an image of the original at the reading position by the reading device, a recording medium conveying step of conveying the recording medium to the recording position, a recording step of causing the recording device to record an image on the recording medium at the recording position, and a control step of causing the reading device to move from the reading position to the reading standby position only once after completion of a reading operation in the reading step and before start of a recording operation in the recording step when the recording operation in the recording step immediately follows the reading operation in the reading step.

To attain the above object, in a eighth aspect of the present invention, there is provided a reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within the same space on the shared conveying path as the reading device, is freely movable between a recording position on the shared conveying path and a recording standby position away from the recording position, and records an image on the recording medium, the method comprising an original conveying step of conveying the original to the reading position, a reading step of reading an image of the original at the reading position by the reading device, a recording medium conveying step of conveying the recording medium to the recording position, a recording step of causing the recording device to record an image on the recording medium at the recording position, a first control step of causing the reading device to move from the reading position to the reading standby position after completion of a reading operation in the reading step, and a second control step of causing the reading device to move from the reading position to the reading standby position before start of a recording operation in the recording step, wherein either the first control step or the second control step is executed to cause the reading device to move from the reading position to the reading standby position after completion of a reading operation in the reading step and before start of a recording operation in the recording step when the recording operation in the recording step immediately follows the reading operation in the reading step.

To attain the above object, in a ninth aspect of the present invention, there is provided a computer-readable program for causing a computer to execute a reading/recording control method according to the fifth aspect of the present invention.

To attain the above object, in a tenth aspect of the present invention, there is provided a computer-readable program for causing a computer to execute a reading/recording control method according to the sixth aspect of the present invention.

To attain the above object, in a eleventh aspect of the present invention, there is provided a computer-readable program for causing a computer to execute a reading/recording control method according to the seventh aspect of the present invention.

To attain the above object, in a twelfth aspect of the present invention, there is provided a computer-readable program for causing a computer to execute a reading/recording control method according to the eighth aspect of the present invention.

The above and other objects of the present invention will become more apparent from the following detailed description taken in conjunction with the accompanying drawings.

DETAILED DESCRIPTION OF THE PREFERRED EMBODIMENTS

The present invention will now be described in detail with reference to the accompanying drawings showing a preferred embodiment thereof.

Figure 1:
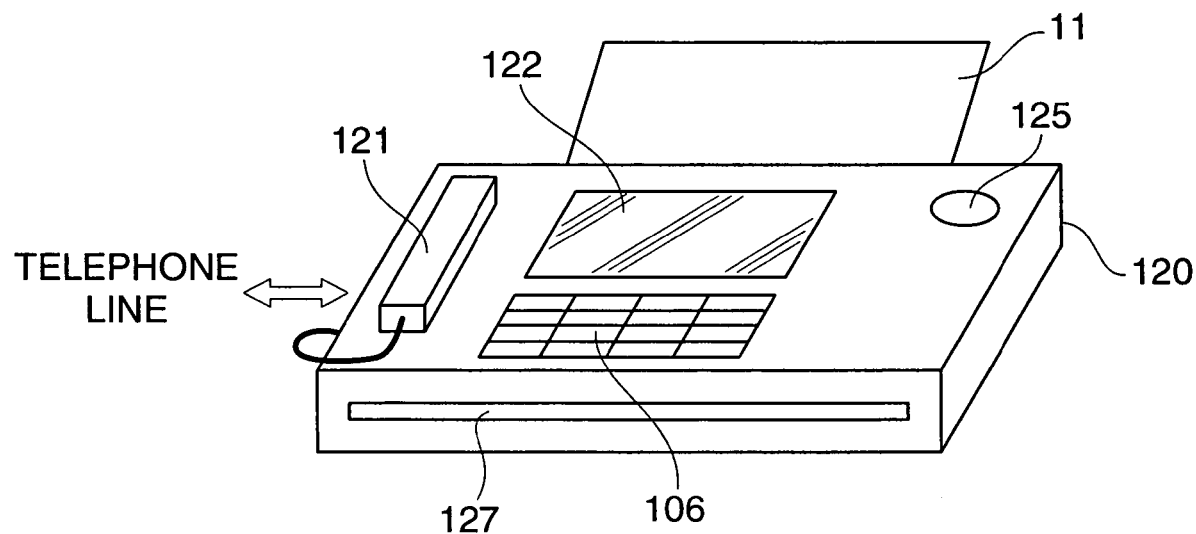
FIG. 1 is a perspective view showing the external appearance of a multifunction communication apparatus as a reading/recording apparatus according to an embodiment of the present invention.

FIG. 1 is a perspective view showing the external appearance of a reading/recording apparatus according to the embodiment. The reading/recording apparatus according to the present embodiment is applied to a multifunction communication apparatus that has a facsimile communication function and a copying function. This multifunction communication apparatus has a casing 120 with a discharge opening 127 provided in a front side thereof and an original tray 11 provided on a rear side thereof. A handset 121, a display 122, an operating section 106, an original discharge button (discharge key) 125, and so forth are provided on an upper surface of the casing 120.

The display 122 displays the state of the multifunction communication apparatus, a telephone number, and so forth. The operating section 106 is comprised of a plurality of keys and is used to input a telephone number or various kinds of setting information and to give instructions for operations. The original discharge button 125 is pressed to discharge an original or a recording sheet.

Figure 2:
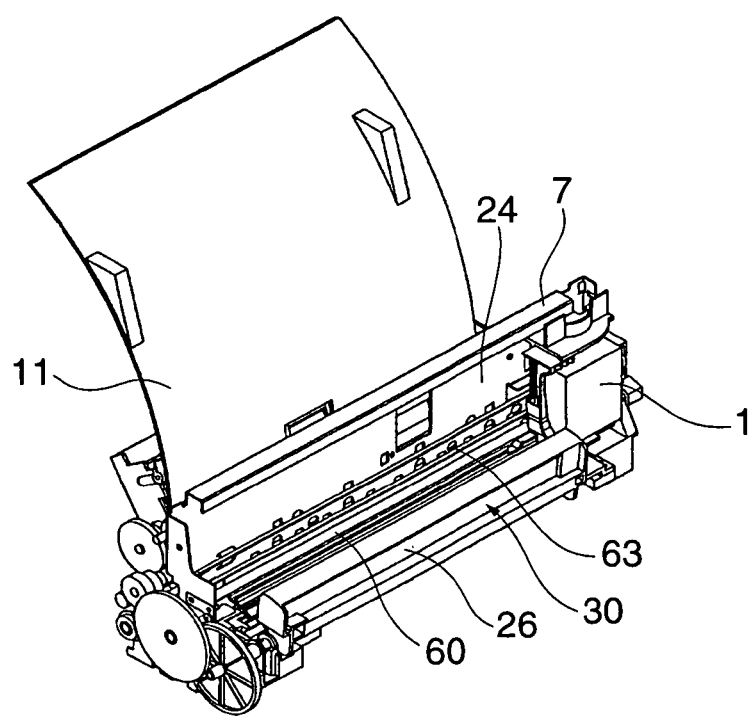
FIG. 2 is a perspective view showing the internal construction of the multifunction communication apparatus of FIG. 1.
Figure 3:
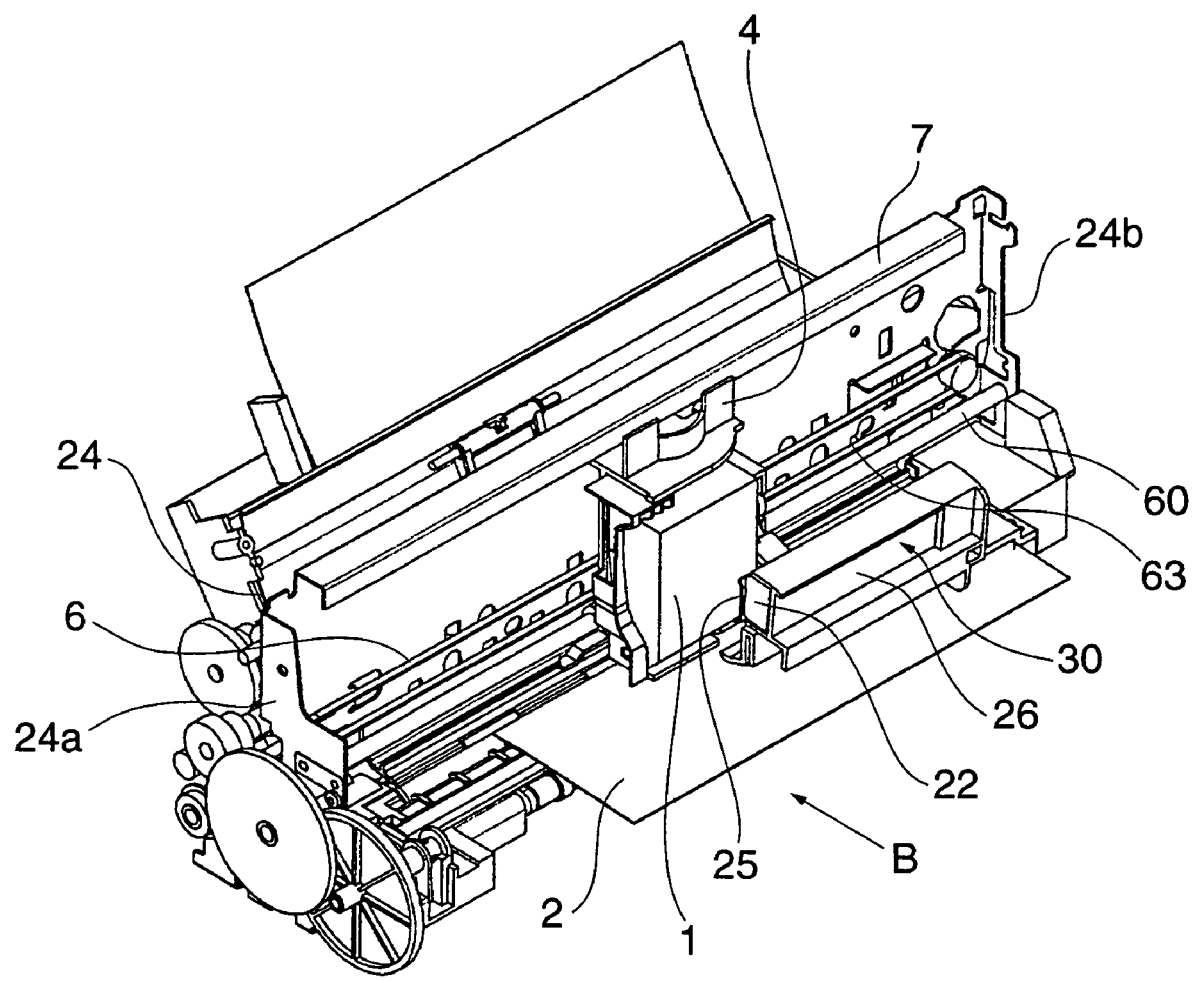
FIG. 3 is a perspective view showing the internal construction of the multifunction communication apparatus of FIG. 1 in a state where a recording unit is operating.
Figure 4:
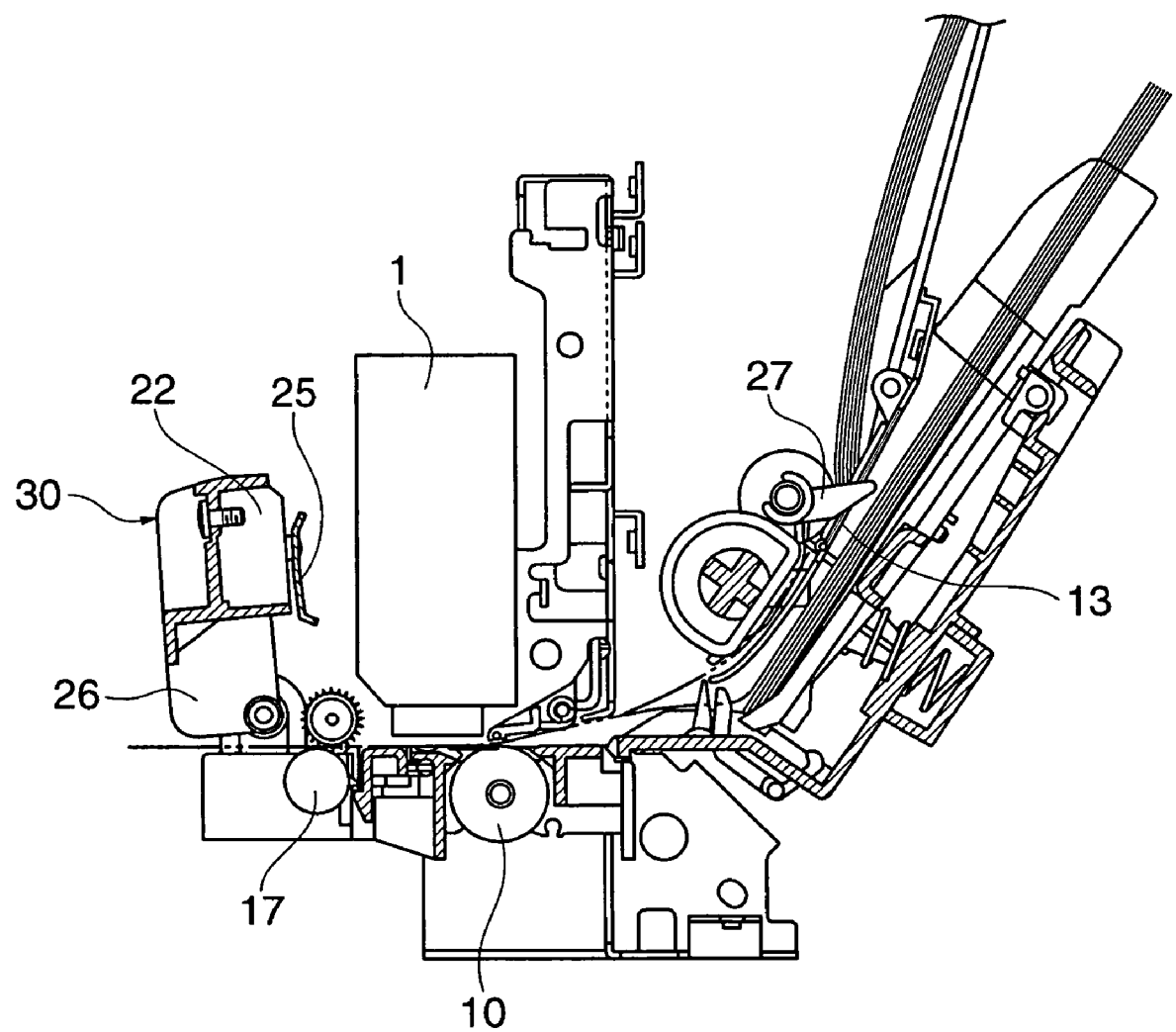
FIG. 4 is a cross-sectional side view showing the internal construction of the multifunction communication apparatus of FIG. 1 in the state where the recording unit is operating.
Figure 5:
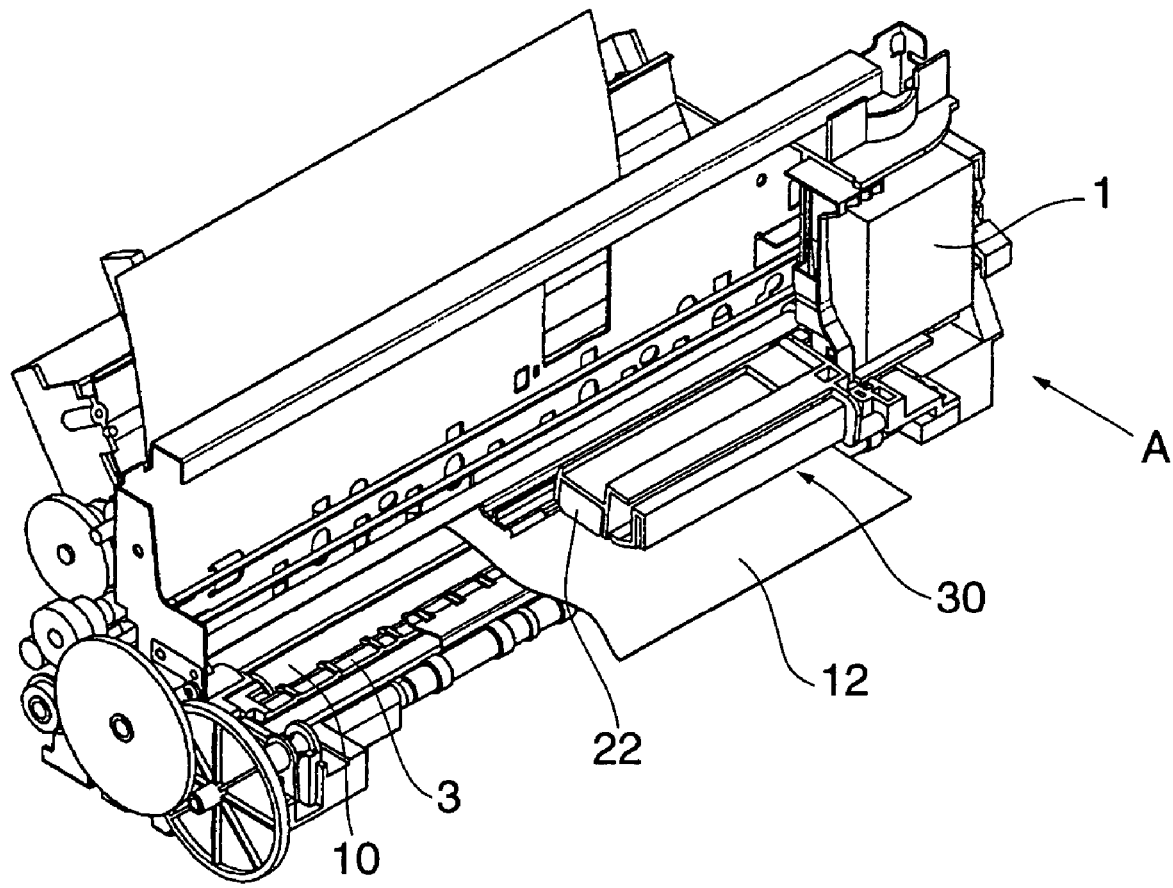
FIG. 5 is a perspective view showing the internal construction of the multifunction communication apparatus of FIG. 1 in a state where the reading unit is operating.
Figure 6:
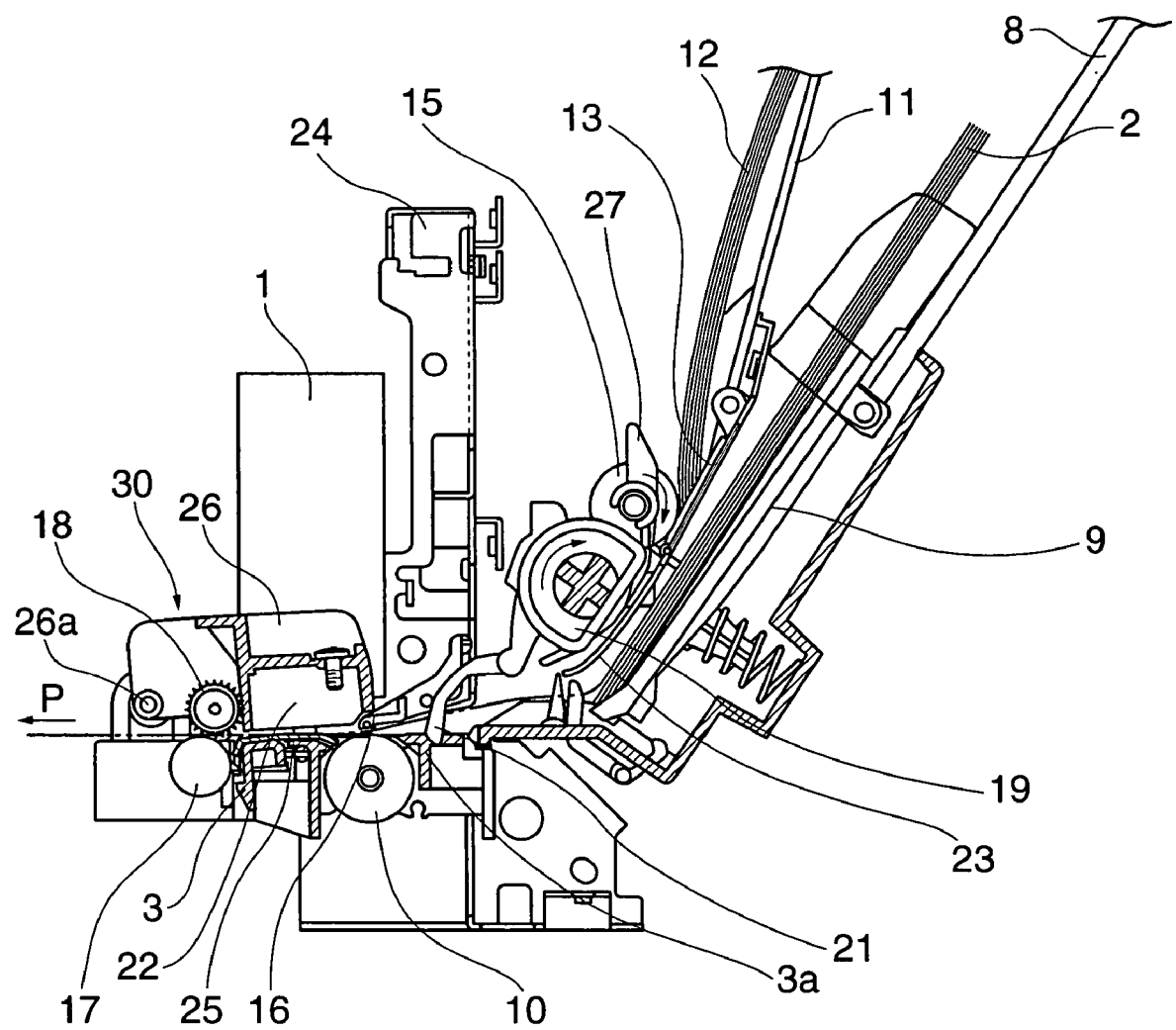
FIG. 6 is a cross-sectional side view showing the internal construction of the multifunction communication apparatus of FIG. 1 in the state where the reading unit is operating.

FIG. 2 is a perspective view showing the internal construction of the multifunction communication apparatus of FIG. 1. FIG. 2 shows a state where neither a recording sheet nor an original has been set and neither a reading unit nor a recording unit is operating, so that both the units are located in receded positions. FIG. 3 is a perspective view showing the internal construction of the multifunction communication apparatus of FIG. 1 in a state where the recording unit is operating. FIG. 4 is a cross-sectional side view showing the internal construction of the multifunction communication apparatus of FIG. 1 in a state where the recording unit is operating. FIG. 5 is a perspective view showing the internal construction of the multifunction communication apparatus of FIG. 1 in a state where the reading unit is operating. FIG. 6 is a cross-sectional side view showing the internal construction of the multifunction communication apparatus of FIG. 1 in a state where the reading unit is operating.

In FIGS. 2 to 6, reference numeral 1 designates an ink cartridge (the recording unit) that carries out recording, 3 a platen that is disposed in opposition to a surface of an original during a reading operation and to a surface of a recording sheet during a recording operation; 3a a platen supporting member that supports the platen 3; 8 a recording sheet tray on which recording sheets 2 are placed; 9 a pressing plate that presses the recording sheets 2 onto a recording sheet separating roller 19 when a recording sheet is to be separated; 10 a feed roller that feeds a conveyed medium (an original or a recording sheet) when reading or recording is carried out; 11 an original tray that holds originals, 13 a separating arm that separates an original 12; 15 an original separating roller that applies a force required to separate an original; 16 a pinch roller that supplements a driving force of the feed roller 10 during the feeding of the conveyed medium; 17 a discharge roller that discharges the conveyed medium out of the apparatus during reading and recording; 18 a spur that supplements a driving force of the discharge roller 17 when the conveyed medium is discharged; 19 a recording sheet separating roller that applies a force required to separate a recording sheet; and 21 a conveyed medium detecting sensor (paper edge sensor or "PES") that detects the presence of a conveyed medium during reading or recording.

Further, reference numeral 22 designates a contact image sensor (CS) that carries out a reading operation; 23 an original lower guide member that guides an original 12; 24 a chassis; 25 a white reference determining member that determines a white reference level of an image read by the contact image sensor (CS) 22 during an operation that reads an original; and 26 a contact image sensor holder (CS holder) that supports the CS 22 and the white reference determining member 25, and is also supported for free rotation with respect to the apparatus main body about a rotary shaft 26a extending in a main scanning direction. A reading unit 30 is comprised of the CS holder 26, the CS 22, and the white reference determining member 25. During a reading operation, the CS holder 26 rotates to a reading position close to a recording section (that is, a recording position) on the platen 3, and an image of the original that passes a shared conveying path is read by the CS 22. On the other hand, during a recording operation, the CS holder 26 rotates away from the reading position on the platen 3 to a reading standby position, and a recording unit 1 that is freely movable on the platen 3 in the main scanning direction carries out a recording operation on the recording sheet that passes the shared conveying path.

Reference numeral 27 designates an original detecting sensor (DS: document sensor) used for detecting the presence of an original on the original tray 11. During a reading operation, a document is detected by the DS 27 and the PES 21 detects whether a conveyed medium (an original or a recording sheet) has passed a predetermined position on the shared conveying path. It should be noted that when the apparatus is in reading mode in response to a start request for a reading operation being issued, in which an original is conveyed, if the PES 21 is not turned on and the DS 27 remains on, it is judged that an abnormality has occurred during conveying of the original, and an original jam (hereinafter referred to as "a paper jam") flag is set.

The recording unit 1 is provided therein with an ink tank and an ink head (recording head), and records an image based on image information by injecting ink from the ink tank onto a recording sheet 2 through nozzles provided on the ink head. The recording unit 1 is detachably attached to a carriage 4 that is guided by a guide rail 7 that is formed in an inverted U-shape integrally with the top of the chassis 24 and a guide shaft 60 supported by side plates 24a, 24b at both ends of the chassis 24. The carriage 4 is fixed to a carriage belt 63 and is driven by a carriage motor to move the recording unit 1 in the main scanning direction.

The reading operation and recording operation of the multifunction communication apparatus with the above construction will be described next. First, when an original 12 is set on the original tray 11 during a reading operation, the original 12 is detected by the original detecting sensor (DS) 27 that is located near the original separating roller 15.

If the user gives an instruction for the start of a reading operation via the operating section 106 in a state where the original 12 has been detected by the original detecting sensor 27, "reading mode" indicative of a reading operation being carried out is stored in a storage section 107 shown in FIG. 7 (described later) as an operation mode, and a reading operation is started. Under the control of a CPU 100 in FIG. 7, the original separating roller 15 is driven to cause one original 12 to be separated by the separating arm 13, and the separated original is fed to the reading position.

At the same time, the CS holder 26 is rotated about the rotary shaft 26a towards the platen 3 by the driving force of the feed roller 10, to bring the CS 22 to the reading position. In this state, the feed roller 10 conveys the original 12 on the shared conveying path and the CS 22 reads an image from the original 12 until a trailing edge of the original 12 is detected by the PES 21. The image read by the CS 22 is converted into image information by a predetermined method and the image information is stored in the storage section 107 shown in FIG. 7.

When the reading of the image from the original 12 has been completed, the original 12 is discharged from the apparatus by the discharge roller 17. When the user has given an instruction for a reading operation for a plurality of originals, after the discharging of an original has been completed, the next original 12 is separated and fed and an image of this next original 12 is read in the same way. When the reading of images has been completed for the number of originals 12 indicated by the user, the CS holder 26 is finally rotated to the reading standby position away from the reading position on the platen 3, and the reading operation is completed.

Next, in a recording operation, when the user gives an instruction for the start of a recording operation using the operating section 106, if the CS holder 26 has been rotated to the reading position, before the recording operation starts, the CS holder 26 is receded from the reading position to the reading standby position. After this, "recording mode" indicative of a recording operation being carried out is stored in the storage section 107 shown in FIG. 7 as the operation mode. Consequently, the ink cartridge (recording unit) 1 can move in the main scanning direction at and in vicinity of the recording section on the platen 3, so that recording can be carried out on the recording sheet 2 that passes on the shared conveying path.

Figure 7:
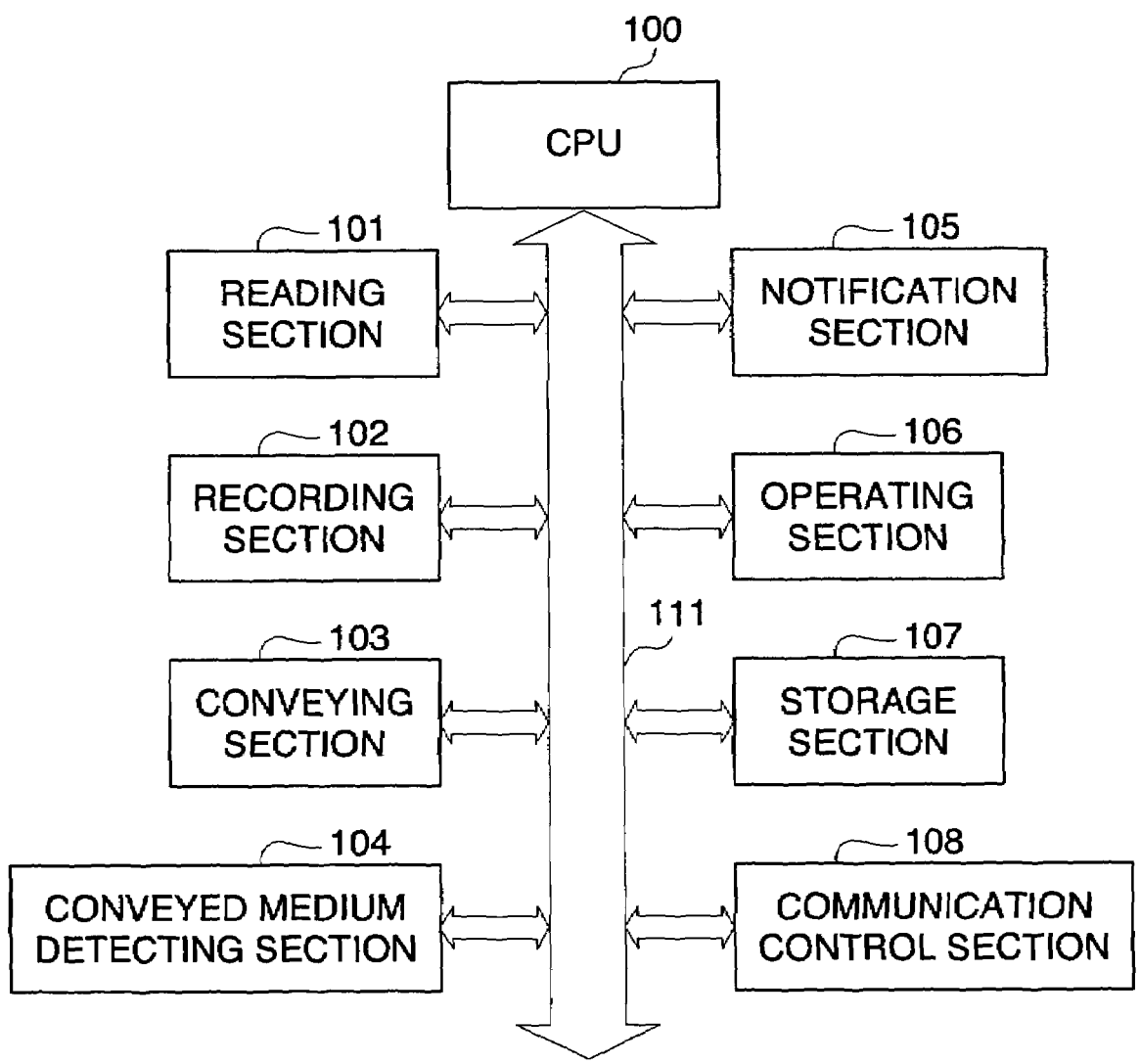
FIG. 7 is a block diagram showing the electrical construction of the multifunction communication apparatus of FIG. 1.

After this, recording sheets 2 are placed on the recording sheet tray 8 and when one recording sheet 2, out of the recording sheets 2 that are pressed by the pressing plate 9, has been separated by the recording sheet separating roller 19 under the control of the CPU 100 shown in FIG. 7, the recording sheet 2 is fed to the recording section (recording position) on the platen 3.

Next, until the trailing edge of the recording sheet 2 conveyed by the feed roller 10 is detected by the PES 21, the recording unit 1 records an image on the recording sheet 2 based on image information stored in the storage section 107 shown in FIG. 7. When the recording of the image has been completed, the recording sheet is discharged from the apparatus by the discharge roller 17. When a recording operation is to be performed for a plurality of recording sheets 2, after the discharging of a recording sheet on which an image has been recorded has been completed, the processes for separating and feeding the next recording sheet 2 on which an image is to be recorded, recording an image, and discharging the recording sheet are repeated for the remaining number of sheets.

Here, when the recording unit 1 is not performing a recording operation, the recording unit 1 stands by at a home position (recording standby position) (a position shown by the arrow A in FIG. 5) and a cap is placed over the recording head of the recording unit 1 to prevent clogging of the recording head caused by drying of the ink. When a recording operation is carried out, the cap is removed, the recording unit 1 is moved to a recovering operation position (a position shown by the arrow B in FIG. 3), and after an initialization operation, such as a recovering operation of the recording head, has been performed, the recording operation starts. Aside from the initialization operation of the recording unit 1 described above, even if no user instruction has been given via the operating section 106, other initialization operations (such as a recovering operation of the ink cartridge 1 and a remaining ink detecting operation) are executed according to predetermined conditions. Also, as for the timing for carrying out a recording operation, the recording unit 1 starts an initialization operation when the PES 21 detects a recording sheet 2.

In the present embodiment, in a reading operation, when reading of image of a number of originals 12 designated by the user has been completed, a reading operation terminating process is carried out in which the CS holder 26 is caused to recede from the reading position. Further, in a recording operation, a recording operation starting process is carried out in which the CS holder 26 is also caused to recede from the reading position so that the ink cartridge (recording unit) 1 can move in the main scanning direction at and in the vicinity of the recording section on the platen 3. In this connection, in a copying operation or the like, the reading operation and the recording operation are consecutively carried out so that a command for causing the CS holder 26 to recede is issued twice. To avoid this, in the present embodiment, the CS holder receding process is not carried out more than required times by a process described later.

FIG. 7 is a block diagram showing the electrical construction of the multifunction communication apparatus of FIG. 1. This multifunction communication apparatus is comprised of the CPU 100, a reading section 101 including the reading unit 30 that reads an original, a recording section 102 including the recording unit 1 that records an image on a recording sheet based on image information received via facsimile communication and/or image information of an original read by the reading unit 30, a conveying section 103 that conveys originals and recording sheets along the shared conveying path, a conveyed medium detecting section 104 including the PES 21 and the DS 27, a notification section 105 that gives a notification when a conveyed medium has been detected by the conveyed medium detecting section 104 and also notifies a user of various states of the apparatus, an operating section 106 that is operated by the user to input various information and to give instructions for operations of the apparatus, a communication control section 108 that controls transmission and reception of image information and communication carried out by the handset 121 via a telephone line, and the storage section 107, with these various components being interconnected via a bus 111. An operation mode such as "reading mode" or "recording mode" is stored in the storage section 107, along with various states of the apparatus and image information based on images read by the reading unit 30. A control program, described later, is also stored in a ROM inside the storage section 107.

Figure 8:
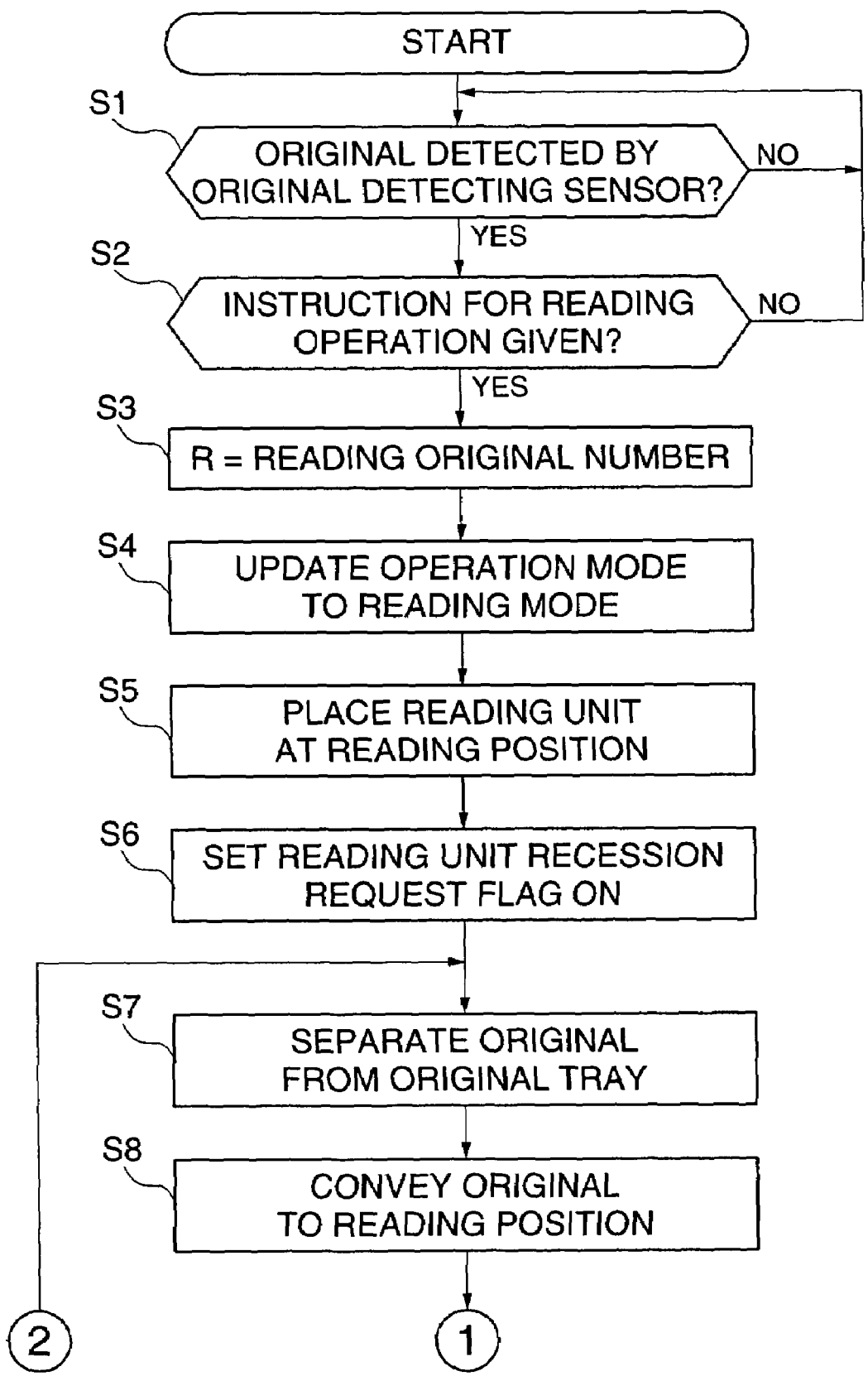
FIG. 8 is a flowchart showing the procedure of a reading unit receding process for bringing the reading unit to a reading standby position after completion of a reading operation by the multifunction communication apparatus of FIG. 1.
Figure 9:
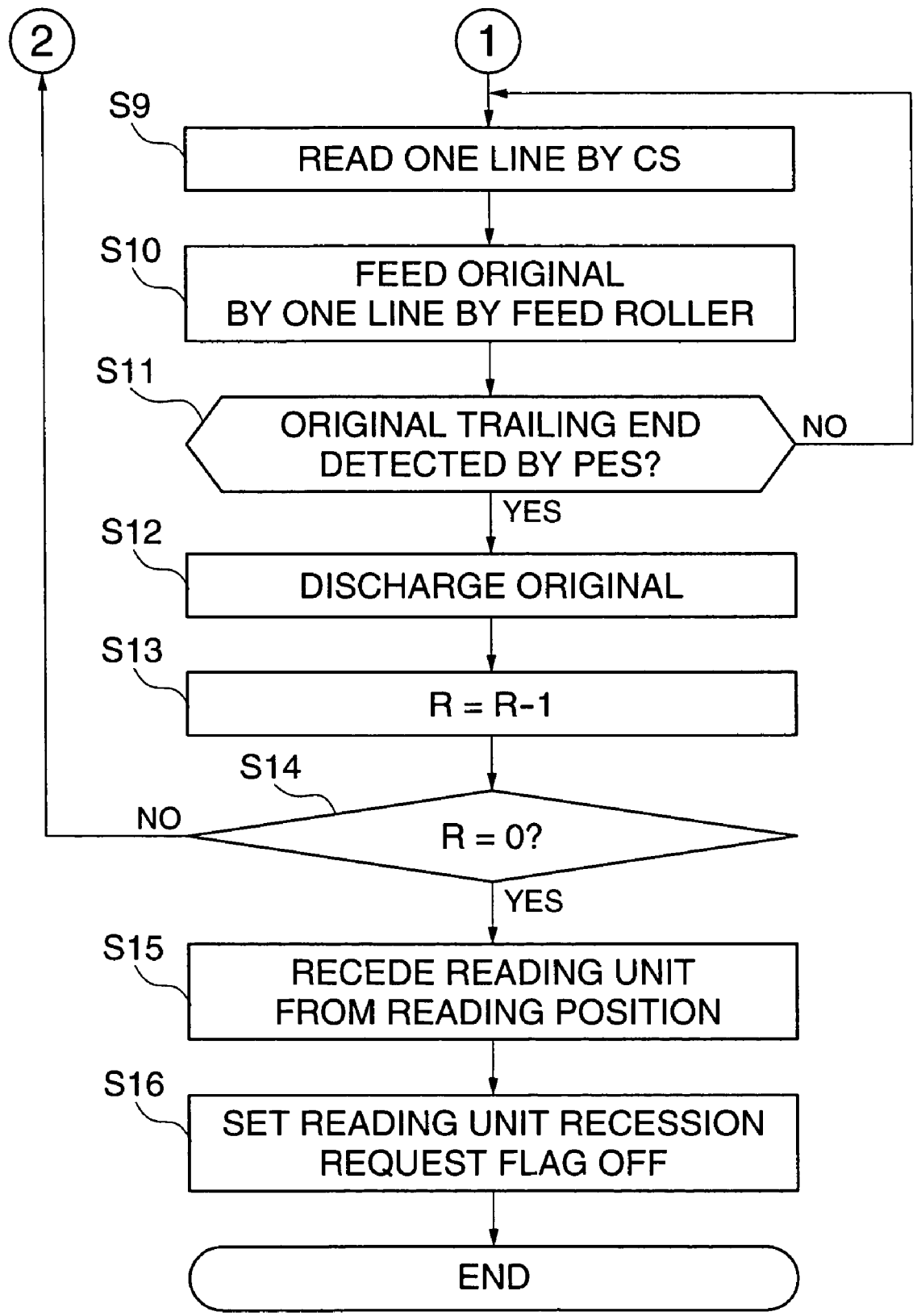
FIG. 9 is a continued part of the flowchart of FIG. 8.

FIGS. 8 and 9 are flowcharts showing the procedure of a reading unit receding process for bringing the reading unit to a reading standby position after completion of a reading operation by the multifunction communication apparatus of FIG. 1. A control program for carrying out this process is stored in the ROM inside the storage section 107, described earlier, and is executed by the CPU 100 at the start of a reading operation.

First, it is determined whether an original has been detected by the original detecting sensor (DS) 27 located near the original separating roller 15 (step S1). When an original 12 has not been detected, the processing in the step S1 is repeated until an original 12 is detected. When an original 12 has been detected, it is determined whether an instruction for a reading operation has been given by the user via the operating section 106 (step S2).

When an instruction for a reading operation has not been given, the process returns to the step S1. On the other hand, when an instruction for a reading operation has been given, the number of originals from which images are to be read is set as a count of a reading original number counter R and stored in the storage section 107 (step S3) and an operation mode stored in the storage section 107 is updated to "reading mode" (step S4).

Then, the CS holder 26 is rotated about the rotary shaft 26a to bring the CS holder 26 to the reading position on the shared conveying path (step S5). Further, a reading unit recession request flag which is managed by the storage section 107 is set ON (step S6).

The driving force of the original separating roller 15 is used to separate one original 12 using the separating arm 13 under the control of the CPU 100 (step S7) and the separated original is conveyed to the reading position (step S8). When the original 12 has been conveyed to the reading position, one line of an image on the original 12 is read by the CS 22 (step S9), and after one line of the image has been read, the original 12 is fed by one line forwards by the feed roller 10 (step S10). It is then determined whether the PES 21 has detected the trailing edge of the original 12 (step S11). When the trailing edge of the original 12 has not been detected, the processing in the step S9 and the processing in the step S10 are repeated. When the trailing edge of the original 12 has been detected in the step S11, the original 12 is discharged from the apparatus by the discharge roller 17 (step S12).

Since one sheet of original has thus been read, the count of the reading original number counter R stored in the storage section 107 is decremented by 1 (step S13). It is then determined whether the counter of the reading original number counter R is equal to "0" (step S14). If the count is not equal to "0", the process returns to the step S7 to separate the next original 12 to be read from the original tray 11 followed by execution of the processing described above. On the other hand, if the count is equal to "0", this means that reading of all sheets of original to be read has been completed, and then the CS holder 26 is rotated to cause the CS 22 to recede from the reading position (step S15). The reading unit recession request flag managed by the storage section 107 is set OFF (step S16), followed by the present process being terminated.

Figure 10:
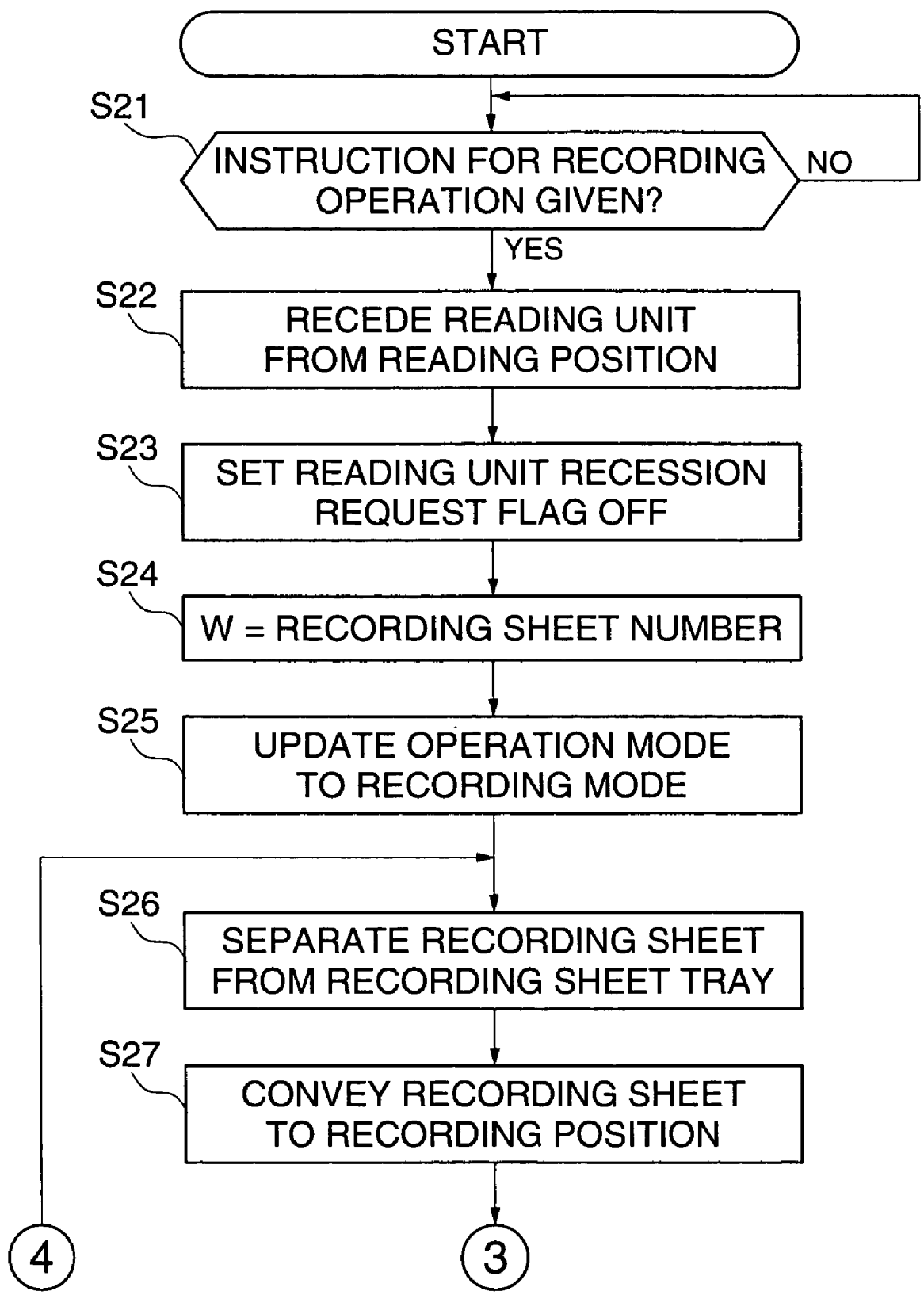
FIG. 10 is a flowchart showing the procedure of a reading unit receding process for bringing the reading unit to the reading standby position before the start of a reading operation by the multifunction communication apparatus of FIG. 1.
Figure 11:
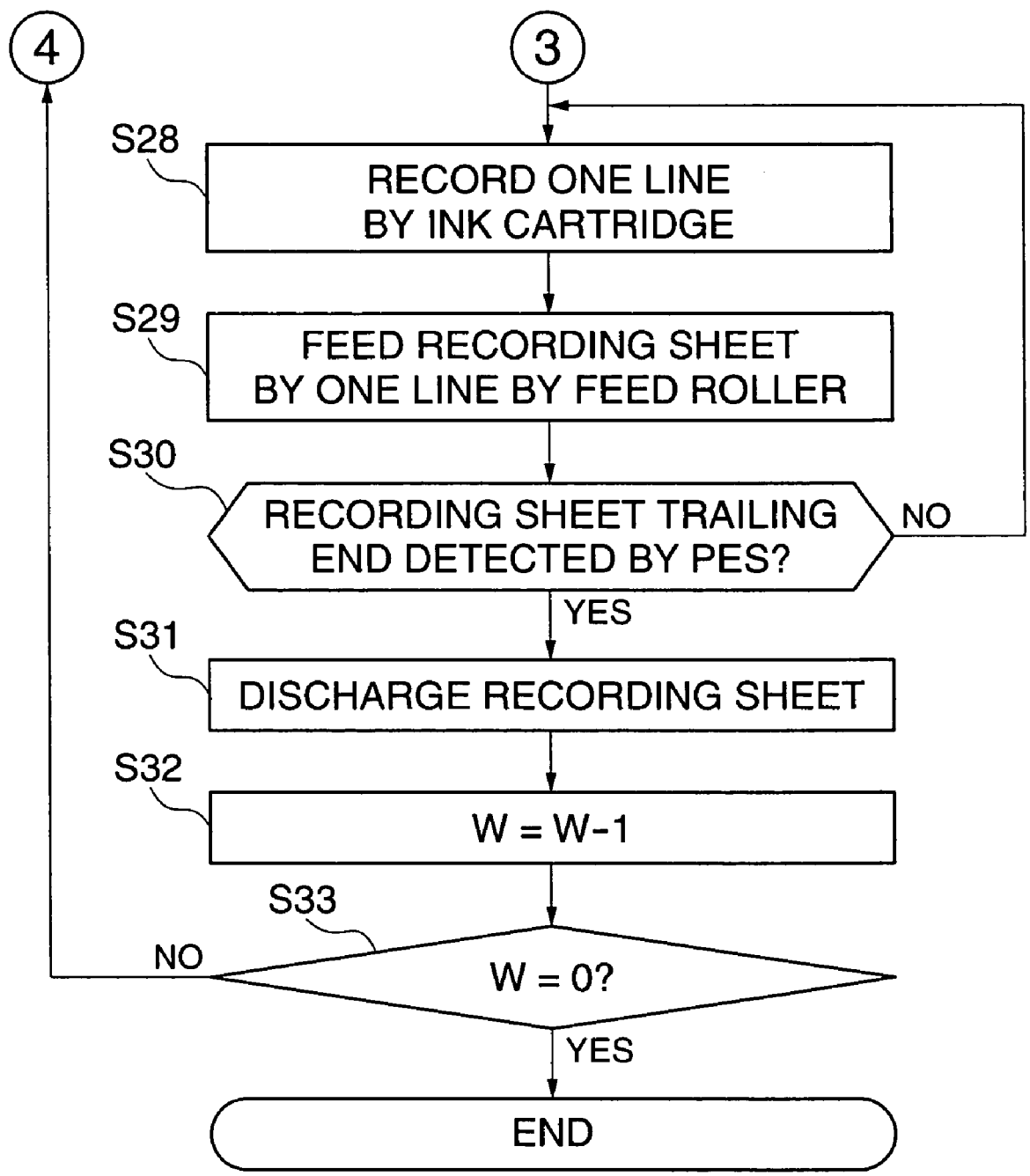
FIG. 11 is a continued part of the flowchart of FIG. 10.

FIGS. 10 and 11 are flowcharts showing the procedure of a reading unit receding process for bringing the reading unit to the reading standby position before the start of a recording operation by the multifunction communication apparatus of FIG. 1. A control program for carrying out this process is stored in the ROM inside the storage section 107, and is executed by the CPU 100 at the start of a recording operation.

First, it is determined whether an instruction for starting a recording operation has been given by the user via the operating section 106 (step S21). If an instruction for starting a recording operation has been given, the CS holder 26 is rotated to cause the CS 22 to recede from the reading position so that the recording unit 1 can move in the main scanning direction at and in the vicinity of the recording section on the platen 3 (step S22). Then, the reading unit recession request flag managed by the storage section 107 is set OFF (step S23).

Then, the number of recording sheets onto which image information is to be recorded is set as a count of a recording sheet number counter W and stored in the storage section 107 (step S24), and the operation mode stored in the storage section 107 is updated to "recording mode" (step S25).

One recording sheet 2, out of recording sheets 2 set on the recording sheet tray 8, that are pressed by the pressing plate 9, is separated by the recording sheet separating roller 19 under the control of the CPU 100 (step S26), and the separated recording sheet 2 is fed to the recording position (step S27). When the recording sheet has been conveyed to the recording position, one line of the image is recorded by the recording unit 1 (step S28). Then the recording sheet 2 is fed by one line forwards by the feed roller 10 (step S29). It is then determined whether the trailing edge of the recording sheet 2 has been detected by the PES 21 (step S30). If the trailing edge of the recording sheet 2 has not been detected, the process returns to the step S28 to repeat the processing in the steps S28 and S29 until the trailing edge of the recording sheet 2 is detected by the PES 21.

On the other hand, when the trailing edge of the recording sheet 2 has been detected by the PES 21, the recording sheet is discharged from the apparatus by the discharge roller 17 (step S31). Since recording of an image onto one recording sheet has thus been completed, the count of the recording sheet number counter W is decremented by 1 (step S32). It is then determined whether the count of the recording sheet number counter W is equal to "0" (step S33). If the count is not equal to "0", the process returns to the step S26 to separate the next recording sheet onto which image information is to be recorded, from the recording sheet tray 8. On the other hand, if the count is equal to "0", this means that recording onto all sheets onto which image information is to be recorded has been completed, the present process is terminated.

Figure 12:
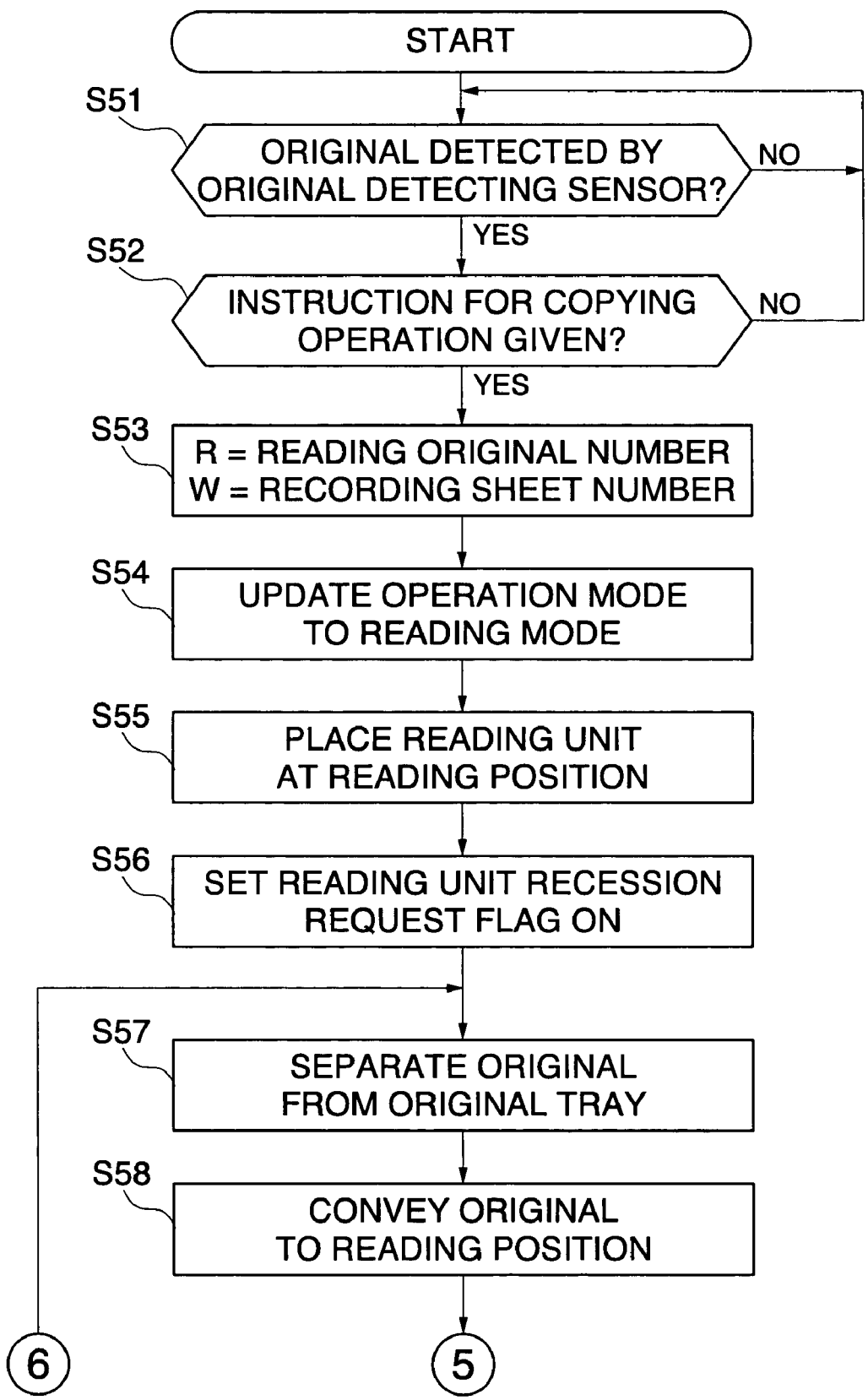
FIG. 12 is a flowchart showing the procedure of a copying process by the multifunction communication apparatus of FIG. 1.
Figure 13:
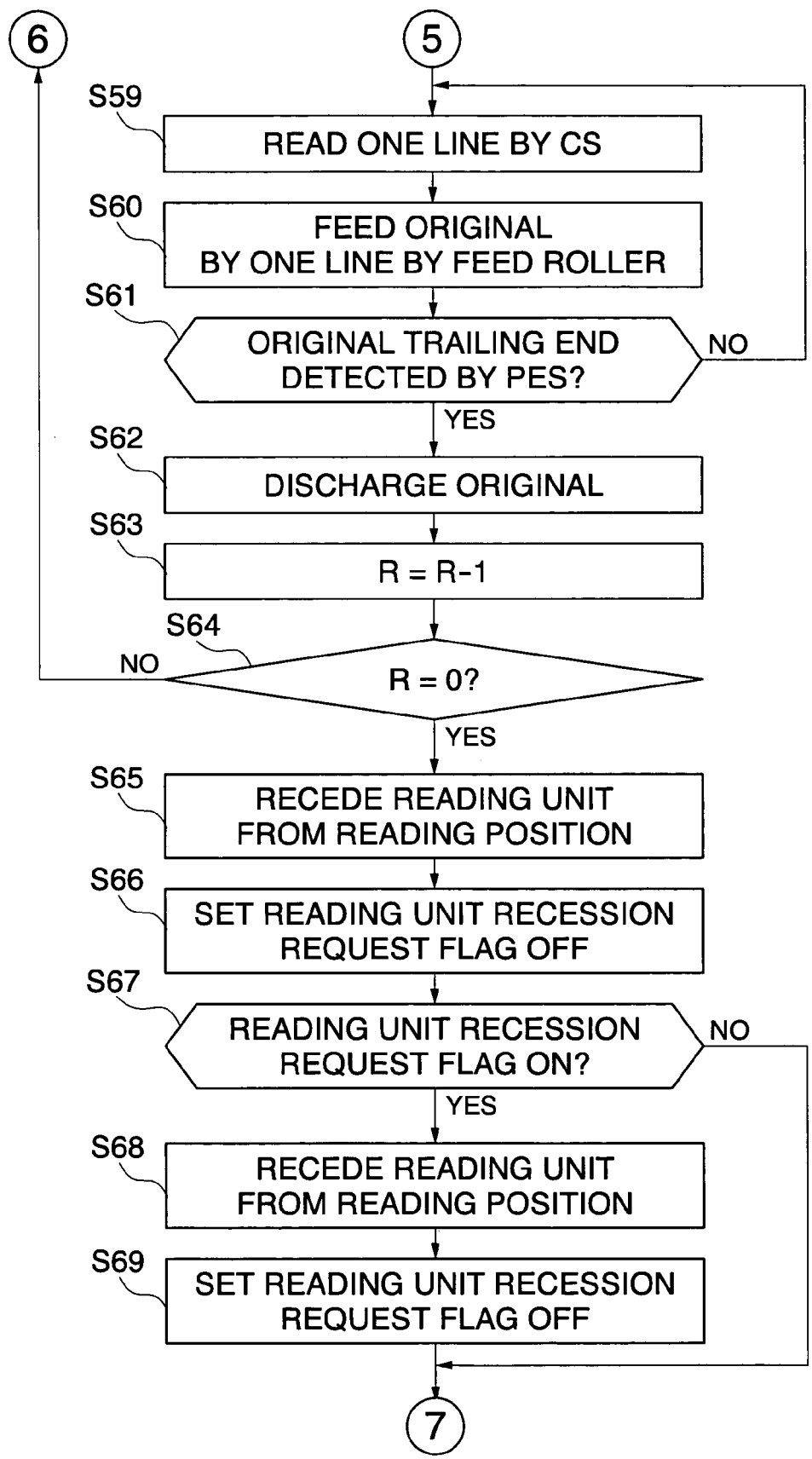
FIG. 13 is a continued part of the flowchart of FIG. 12.
Figure 14:
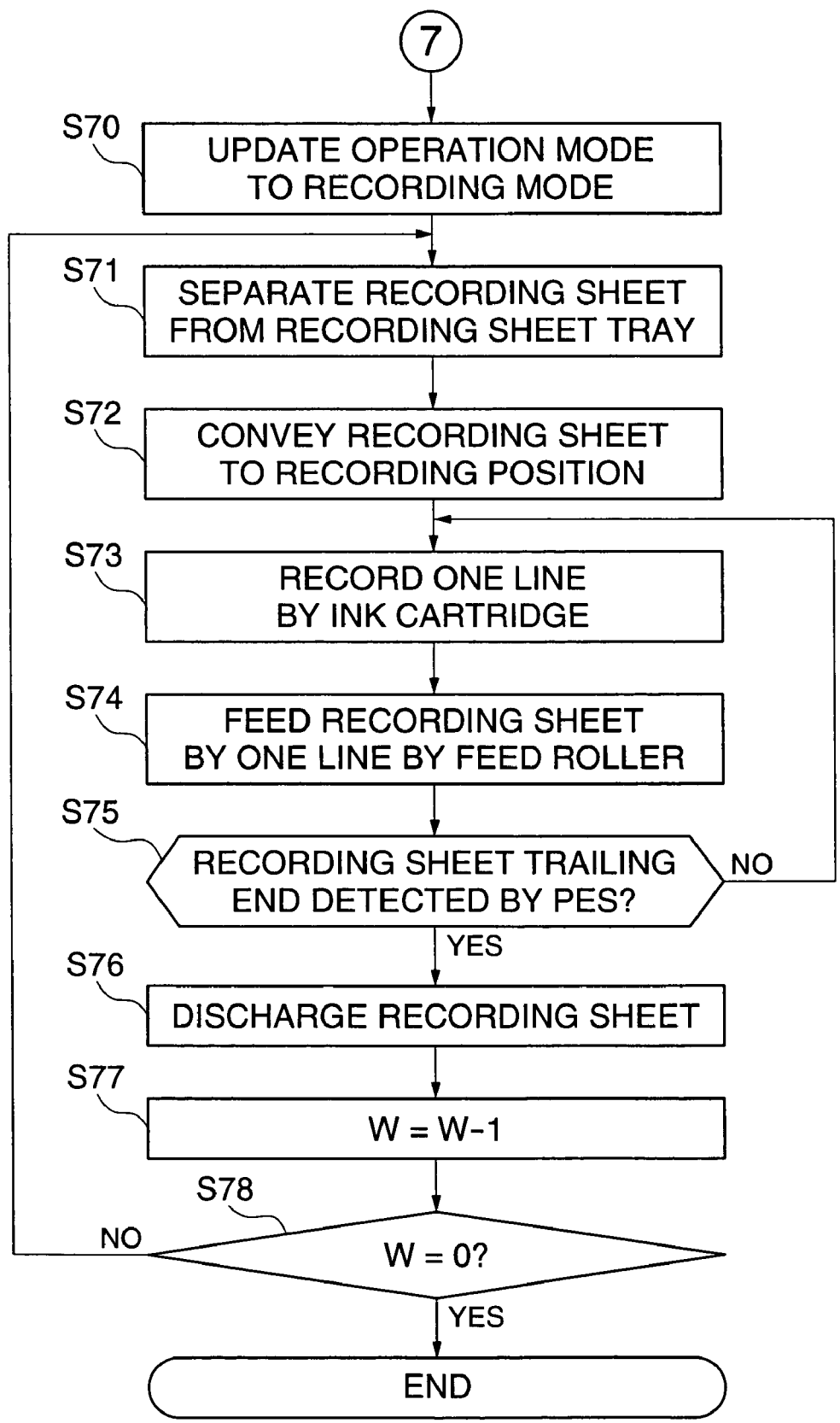
FIG. 14 is a continued part of the flowcharts of FIGS. 12 and 13.
Figure 15:
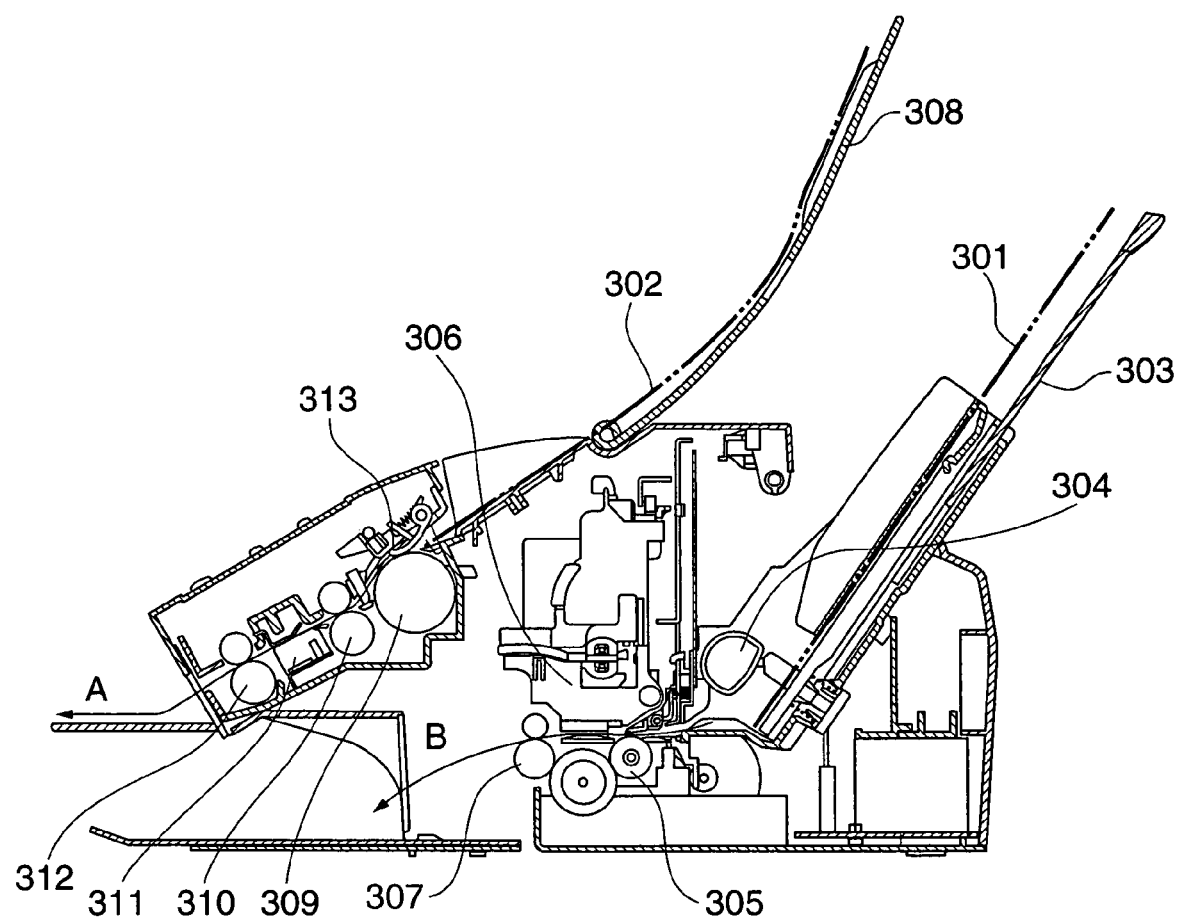
FIG. 15 is a cross-sectional view showing the construction of a conventional reading/recording apparatus.

FIGS. 12, 13, and 14 are flowcharts showing the procedure of a copying process by the multifunction communication apparatus of FIG. 1. A control program for carrying out this process is stored in the ROM inside the storage section 107, and is executed by the CPU 100 at the start of a copying operation. In the present embodiment, the copying operation is carried out by first reading images on all originals to be copied, storing image information on the read images in the storage section 107, and recording the images of the stored image information onto recording sheets.

First, it is determined whether an original 12 has been detected, by the original detecting sensor (DS) 17 disposed in the vicinity of the original separating roller 15 (step S51). If an original 12 has not been detected, the processing in the step S51 is repeated, whereas, if an original 12 has been detected, it is determined whether an instruction for carrying out a copying operation has been given by the user via the operating section 106 (step S52).

If an instruction for carrying out a copying operation has not been given, the process returns to the step S51, whereas, if an instruction for carrying out a copying operation has been given, the number of originals from which images are to be read is set as the count of the reading original number counter R, and the number of recording sheets onto which the images are to be recorded is set as the count of the recording sheet number counter W and the set numbers are stored in the storage section 107 (step S53). Then, the operation mode stored in the storage section 107 is updated to the "reading mode" (step S54).

Then, the CS holder 26 is rotated into the reading position (step S55), and the reading unit recession request flag managed by the storage section 107 is set ON (step S56). The driving force of the original separating roller 15 is used to separate one original using the separating arm 13 under the control of the CPU 100 (step S57), and the original is conveyed to the reading position (step S58).

When the original has been conveyed to the reading position, the CS 22 is caused to read one line of the image (step S59). Then, the original is fed by one line by the feed roller 10 (step S60). It is then determined whether the trailing end of the original has been detected by the PES 21 (step S61). If the trailing end of the original has not been detected, the processing in the steps S59 and S60 is repeated until the trailing end of the original is detected. On the other hand, if the trailing end of the original is detected in the step s61, the original is discharged from the apparatus by the discharging roller 17 (step S62). When reading of one original has been completed, the count of the reading original number counter R stored in the storage section 107 is decremented by 1 (step S63).

Then, it is determined whether the count of the reading original number counter R is equal to "0" (step S64). If the count of the reading original number counter R is not equal to "0", the process returns to the step S57 to separate the next original from which an image is to be read, from the original tray 11 to repeat the above described processing, whereas, if it is determined in the step S64 that the count of the reading original number counter R is equal to "0", this means that reading of all originals to be read has been completed, and then the CS holder 26 is rotated so that the CS 22 recedes from the reading position to the reading standby position (step S65). Then, the reading unit recession request flag is set OFF (step S66), and the present process is terminated.

Then, a recording process of the copying operation is carried out. First, it is determined whether the reading unit recession request flag is ON (step S67). If the reading unit recession request flag is ON, the CS holder 26 is rotated so that the CS 22 recedes from the reading position to the reading standby position (step S68). Then, the reading unit recession request flag is set OFF (step S69), and the process proceeds to a step S70. On the other hand, if it is determined in the step S67 that the reading unit recession request flag is not ON, the process proceeds directly to the step S70.

Then, the operation mode stored in the storage section 107 is updated to the recording mode (step S70). Out of recording sheets set on the recording tray 8 that are pressed by the pressing plate 9, one recording sheet is separated by the recording sheet separating roller 19 under the control of the CPU 100 (step S71), and the recording sheet is conveyed to the recording position (STEP S72). When the recording sheet has been conveyed to the recording position, one line of the image is recorded onto the recording sheet by the recording unit 1 (step S73). Then, the recording sheet is fed by one line by the feed roller 10 (step S74). It is determined whether the trailing end of the recording sheet has been detected by the PES 21 (step S75), and if the trailing end of the recording sheet has not been detected, the process returns to the step S73, to repeat the processing in the steps S73 and S74 until the trailing end of the recording sheet is detected.

On the other hand, if it is determined in the step S75 that the trailing end of the recording sheet has been detected by the PES 21, the recording sheet 2 is discharged from the apparatus by the discharge roller 17 (step S76). Since one recording sheet has thus been recorded, the count of the recording sheet number counter W is decremented by 1 (step S77). It is then determined whether the count of the recording sheet number counter W is equal to "0" (step S78). If the count is not equal to "0", the process returns to the step S71, to separate the next recording sheet to be recorded, from the recording sheet tray 8, whereas, if the count is equal to "0", this means that recording of all recording sheets to be recorded has been completed, and then the present process is terminated.

Although in the present embodiment, when a copying operation is carried out, the process for causing the reading unit to recede from the reading position is carried out in the step S65 after completion of the reading operation without exception, this is not limitative, and the same process may be carried out in the step S68 before the start of the recording operation without exception. In this case, the processing in the steps S65 and S66 are omitted.

As described above, according to the multifunction communication apparatus of the present embodiment, when the reading unit 30 and the recording unit 1 shares a moving space on a shared conveying path used for conveying both originals and recording sheets, the reading unit 30 is caused to recede from the reading position to the reading standby position after completion of the reading operation or before the start of the recording operation. It is, therefore, possible to prevent the reading unit 30 and the recording unit 1 from colliding.

Moreover, it can be avoided that the reading unit 30 remains on the shared conveying path during the recording operation, thus making it possible to prevent a paper jam from occurring. It is also possible to reduce the time spent on exclusive control operation of one of the reading unit 30 and the recording unit 1 within the shared moving space, thereby suppressing delays in reading and recording operations.

Further, in the case of a copying operation in which a recording operation is carried out immediately following a reading operation, the process for causing the reading unit 30 to recede from the reading position is carried out only in one of the step S65 after completion of the reading operation or the step S68 before the start of the recording operation, that is, the process for causing the reading unit 30 to recede from the reading position can be carried out only once.

The present invention is not limited to the above described embodiment and can be applied to any construction that can achieve the functions described in the appended claims or the functions of the construction of the above described embodiment.

For example, although the present invention is applied to a multifunction communication apparatus with a facsimile communication function and a copying function in the above embodiment, the present invention is not limited to a facsimile apparatus, a copier, or the like, and can be applied to a variety of appliances that can perform a reading operation for an original and a recording operation.

The present invention may either be applied to a system composed of a plurality of apparatuses or to a single apparatus.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark). disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code. Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A reading/recording apparatus comprising:
   a shared conveying path used as both a conveying path for an original and a conveying path for a recording medium;
   an original conveying device that conveys the original to a reading position on said shared conveying path;
   a reading device that is freely movable between the reading position and a reading standby position away from the reading position and reads an image of the original at the reading position;
   a recording medium conveying device that conveys the recording medium to a recording position on said shared conveying path;
   a recording device that moves within a same space on said shared conveying path as said reading device, is freely movable between the recording position and a recording standby position away from the recording position, and records an image on the recording medium at the recording position; and
   a control device that causes said reading device to move from the reading position to the reading standby position after a reading operation by said reading device has been completed,
   wherein the reading device and the printing device share the same space when the reading device is in the reading position and the printing device is in the printing position.

2. A reading/recording apparatus as claimed in claim 1, comprising a rotary shaft extending in a main scanning direction, and wherein said reading device is freely rotatable about said rotary shaft between the reading position and the reading standby position, and said control device is responsive to said reading device having read an image of the original at the reading position on said shared conveying path, for causing said reading device to the reading standby position away from the reading position.

3. A reading/recording apparatus as claimed in claim 1, wherein said recording device is freely movable in a main scanning direction on said shared conveying path, and said control device causes said recording device to stay at the recording standby position away from the recording position during the reading operation by said reading device.

4. A reading/recording apparatus comprising:
   a shared conveying path used as both a conveying path for an original and a conveying path for a recording medium;
   an original conveying device that conveys the original to a reading position on said shared conveying path;

a reading device that is freely movable between the reading position and a reading standby position away from the reading position and reads an image of the original at the reading position;

a recording medium conveying device that conveys the recording medium to a recording position on said shared conveying path;

a recording device that moves within a same space on said shared conveying path as said reading device, is freely movable between the recording position and a recording standby position away from the recording position, and records an image on the recording medium at the recording position; and a control device that causes said reading device to move from the reading position to the reading standby position before start of a recording operation by said recording device, wherein the reading device and the printing device share the same space when the reading device is in the reading position and the printing device is in the printing position.

5. A reading/recording apparatus as claimed in claim 4, comprising a rotary shaft extending in a main scanning direction, and wherein said reading device is freely rotatable about said rotary shaft between the reading position and the reading standby position, and said control device is responsive to said reading device having read an image of the original at the reading position on said shared conveying path, for causing said reading device to the reading standby position away from the reading position.

6. A reading/recording apparatus as claimed in claim 4, wherein said recording device is freely movable in a main scanning direction on said shared conveying path, and said control device causes said recording device to stay at the recording standby position away from the recording position during the reading operation by said reading device.

7. A reading/recording apparatus comprising:

a shared conveying path used as both a conveying path for an original and a conveying path for a recording medium;

an original conveying device that conveys the original to a reading position on said shared conveying path;

a reading device that is freely movable between the reading position and a reading standby position away from the reading position and reads an image of the original at the reading position;

a recording medium conveying device that conveys the recording medium to a recording position on said shared conveying path;

a recording device that moves within a same space on said shared conveying path as said reading device, is freely movable between the recording position and a recording standby position away from the recording position, and records an image on the recording medium at the recording position; and a control device that causes said reading device to move from the reading position to the reading standby position only once after completion of a reading operation by said reading device and before start of a recording operation by said recording device when the recording operation by said recording device immediately follows the reading operation by said reading device, wherein the reading device and the printing device share the same space when the reading device is in the reading position and the printing device is in the printing position.

8. A reading/recording apparatus as claimed in claim 7, comprising a rotary shaft extending in a main scanning direction, and wherein said reading device is freely rotatable about said rotary shaft between the reading position and the reading standby position, and said control device is responsive to said reading device having read an image of the original at the reading position on said shared conveying path, for causing said reading device to the reading standby position away from the reading position.

9. A reading/recording apparatus as claimed in claim 7, wherein said recording device is freely movable in a main scanning direction on said shared conveying path, and said control device causes said recording device to stay at the recording standby position away from the recording position during the reading operation by said reading device.

10. A reading/recording apparatus comprising:

a shared conveying path used as both a conveying path for an original and a conveying path for a recording medium;

an original conveying device that conveys the original to a reading position on said shared conveying path;

a reading device that is freely movable between the reading position and a reading standby position away from the reading position and reads an image of the original at the reading position;

a recording medium conveying device that conveys the recording medium to a recording position on said shared conveying path;

a recording device that moves within a same space on said shared conveying path as said reading device, is freely movable between the recording position and a recording standby position away from the recording position, and records an image on the recording medium at the recording position;

a first control device that causes said reading device to move from the reading position to the reading standby position after completion of a reading operation by said reading device; and a second control device that causes said reading device to move from the reading position to the reading standby position before start of a recording operation by said recording device;

wherein either said first control device or said second control device is actuated to cause said reading device to move from the reading position to the reading standby position after completion of a reading operation by said reading device and before start of a recording operation by said recording device when the recording operation by said recording device immediately follows the reading operation by said reading device, wherein the reading device and the printing device share the same space when the reading device is in the reading position and the printing device is in the printing position.

11. A reading/recording apparatus as claimed in claim 10, comprising a rotary shaft extending in a main scanning direction, and wherein said reading device is freely rotatable about said rotary shaft between the reading position and the reading standby position, and said control device is responsive to said reading device having read an image of the original at the reading position on said shared conveying path, for causing said reading device to the reading standby position away from the reading position.

12. A reading/recording apparatus as claimed in claim 10, wherein said recording device is freely movable in a main scanning direction on said shared conveying path, and said control device causes said recording device to stay at the recording standby position away from the recording position during the reading operation by said reading device.

13. A reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within a same space on the shared conveying path as the reading device, is freely movable between a recording position on the shared conveying path and a recording standby position away from the recording position, and records an image on the recording medium, wherein the reading device and the printing device share the same space when the reading device is in the reading position and the printing device is in the printing position, the method comprising:

- an original conveying step of conveying the original to the reading position;
- a reading step of reading an image of the original at the reading position by the reading device;
- a recording medium conveying step of conveying the recording medium to the recording position;
- a recording step of causing the recording device to record an image on the recording medium at the recording position; and
- a control step of causing the reading device to move from the reading position to the reading standby position after a reading operation in said reading step has been completed.

14. A reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within a same space on the shared conveying path as the reading device, is freely movable between a recording position on the shared conveying path and a recording standby position away from the recording position, and records an image on the recording medium, wherein the reading device and the printing device share the same space when the reading device is in the reading position and the printing device is in the printing position, the method comprising:

- an original conveying step of conveying the original to the reading position;
- a reading step of reading an image of the original at the reading position by the reading device;
- a recording medium conveying step of conveying the recording medium to the recording position;
- a recording step of causing the recording device to record an image on the recording medium at the recording position; and
- a control step of causing the reading device to move from the reading position to the reading standby position before start of a recording operation in said recording step.

15. A reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within a same space on the shared conveying path as the reading device, is freely movable between a recording position on the shared conveying path and a recording standby position away from the recording position, and records an image on the recording medium, wherein the reading device and the printing device share the same space when the reading device is in the reading position and the printing device is in the printing position, the method comprising:

- an original conveying step of conveying the original to the reading position;
- a reading step of reading an image of the original at the reading position by the reading device;
- a recording medium conveying step of conveying the recording medium to the recording position;
- a recording step of causing the recording device to record an image on the recording medium at the recording position; and
- a control step of causing the reading device to move from the reading position to the reading standby position only once after completion of a reading operation in said reading step and before start of a recording operation in said recording step when the recording operation in said recording step immediately follows the reading operation in said reading step.

16. A reading/recording control method for a reading/recording apparatus including a shared conveying path used as both a conveying path for an original and a conveying path for a recording medium, a reading device that is freely movable between a reading position on the shared conveying path and a reading standby position away from the reading position and reads an image of the original, and a recording device that moves within a same space on the shared conveying path as the reading device, is freely movable between a recording position on the shared conveying path and a recording standby position away from the recording position, and records an image on the recording medium, wherein the reading device and the printing device share the same space when the reading device is in the reading position and the printing device is in the printing position, the method comprising:

- an original conveying step of conveying the original to the reading position;
- a reading step of reading an image of the original at the reading position by the reading device;
- a recording medium conveying step of conveying the recording medium to the recording position;
- a recording step of causing the recording device to record an image on the recording medium at the recording position;
- a first control step of causing the reading device to move from the reading position to the reading standby position after completion of a reading operation in said reading step; and
- a second control step of causing the reading device to move from the reading position to the reading standby position before start of a recording operation in said recording step;
- wherein either said first control step or said second control step is executed to cause the reading device to move from the reading position to the reading standby position after completion of a reading operation in said reading step and before start of a recording operation in said recording step when the recording operation in said recording step immediately follows the reading operation in said reading step.

17. A computer-readable medium storing a computer program for causing a computer to execute a reading/recording control method as claimed in claim 13.

18. A computer-readable medium storing a computer program for causing a computer to execute a reading/recording control method as claimed in claim 14.

19. A computer-readable medium storing a computer program for causing a computer to execute a reading/recording control method as claimed in claim 15.

20. A computer-readable medium storing a computer program for causing a computer to execute a reading/recording control method as claimed in claim 16.

* * * * *